(No Model.) 2 Sheets—Sheet 1.
C. A. HIGBEE.
TOOL FOR TRIMMING SCREW THREADS.

No. 501,942. Patented July 25, 1893.

WITNESSES:

INVENTOR:
Clinton A. Higbee
by his atty.
Francis T. Chambers

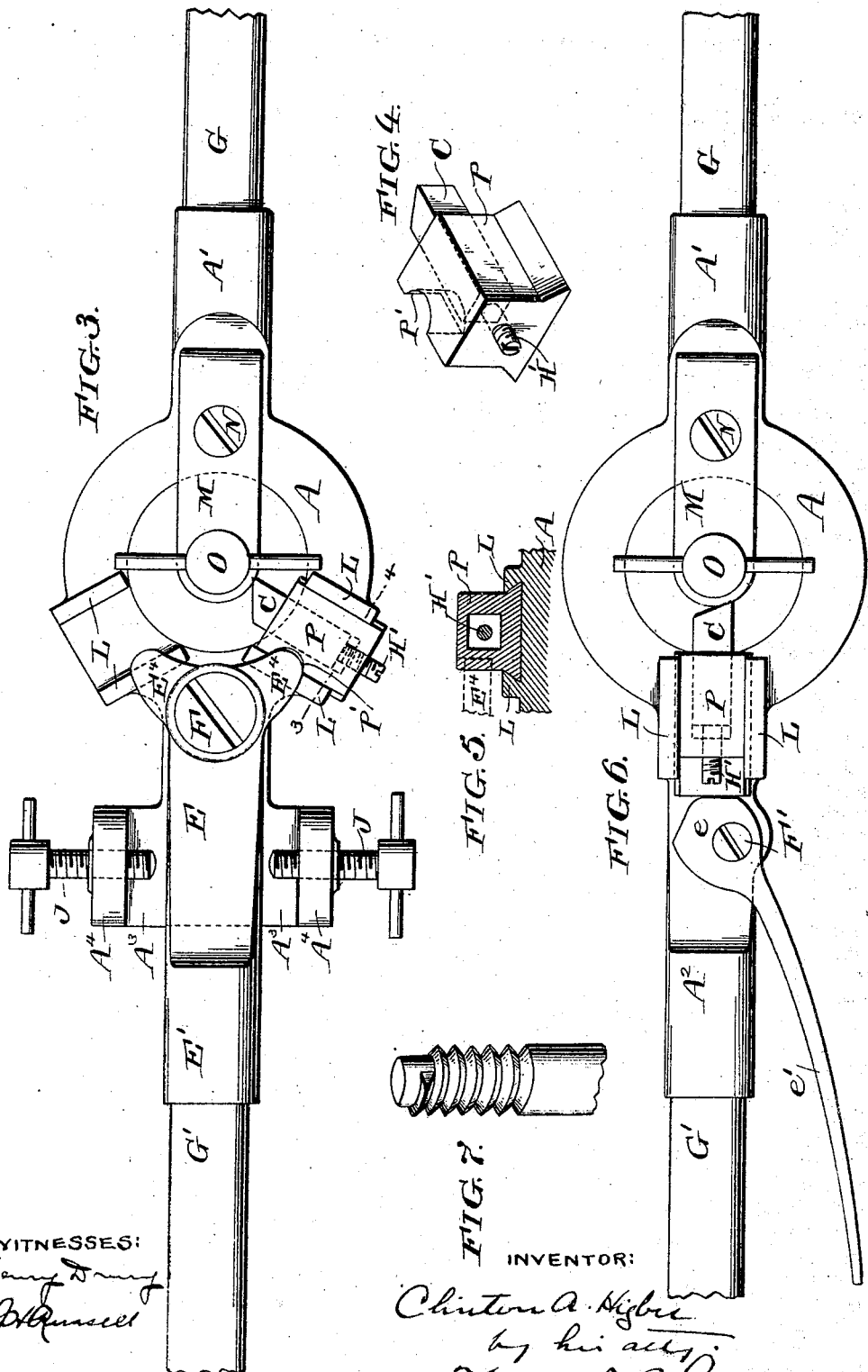

UNITED STATES PATENT OFFICE.

CLINTON A. HIGBEE, OF PHILADELPHIA, PENNSYLVANIA.

TOOL FOR TRIMMING SCREW-THREADS.

SPECIFICATION forming part of Letters Patent No. 501,942, dated July 25, 1893.

Application filed June 20, 1892. Serial No. 437,243. (No model.)

*To all whom it may concern:*

Be it known that I, CLINTON A. HIGBEE, of Philadelphia, county of Philadelphia, State of Pennsylvania, have invented a certain new and useful Tool for Trimming Screw-Threads, of which the following is a true and exact description, reference being had to the accompanying drawings, which form a part of this specification.

My invention relates to the construction of tools adapted to cut away a portion of the thread of a screw; my object being to provide convenient means for forming screws, the threads of which are cut away abruptly in the manner shown and described in my Patent No. 447,775, dated March 10, 1891.

The nature of my invention will be best understood as described in connection with the drawings in which it is illustrated as applied to a hand tool, and in which—

Figure 1:
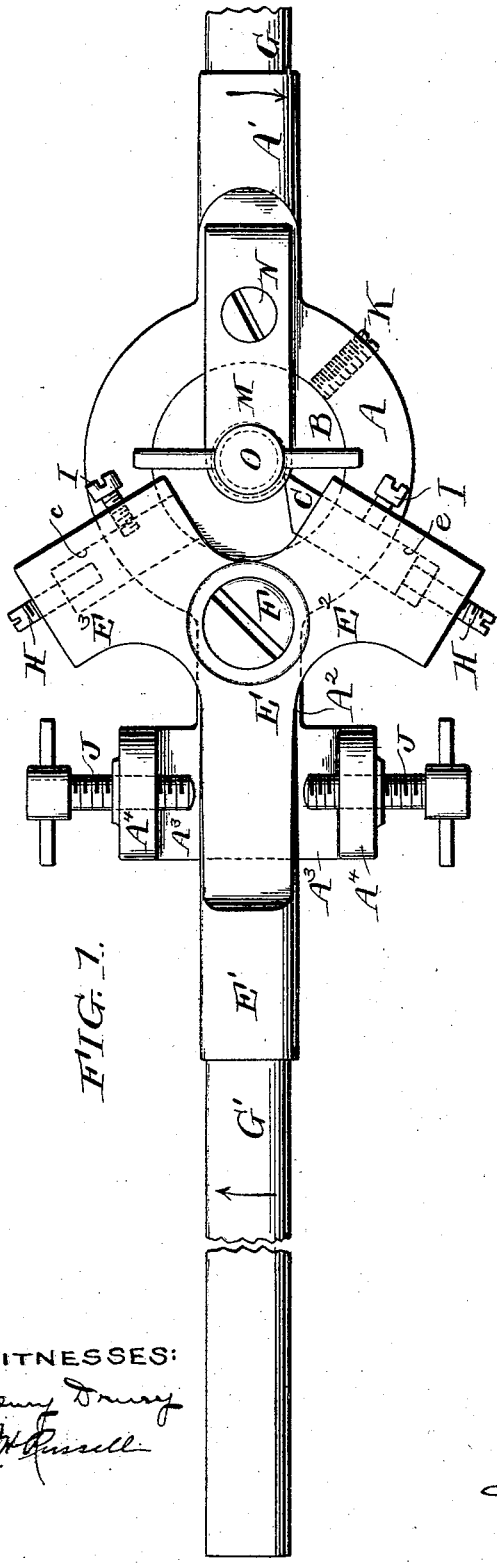
Figure 2:
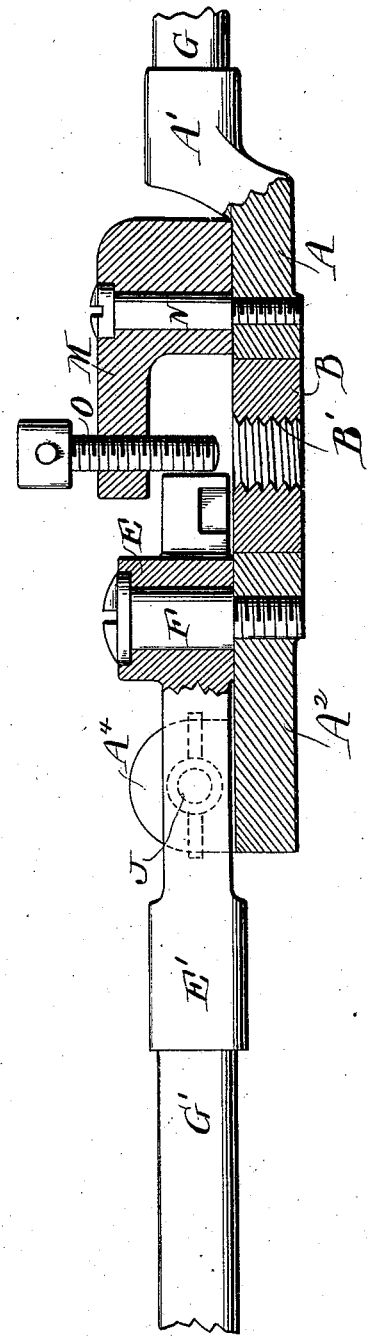

Figure 1 is a plan view of the tool; Fig. 2 a central longitudinal section on the line 1—2 of Fig. 1; Fig. 3 a plan view illustrating a modification; Fig. 4 a perspective view of a part of the device shown in Fig. 3; Fig. 5 a cross section on the line 3—4 of Fig. 3; Fig. 6 a plan view illustrating another modification in the construction of the tool, and Fig. 7 a view showing the end of a screw such as is described in my former patent before mentioned.

A is the outer frame of a die B, at the center of which is a screw threaded opening B' as shown in the drawings, or which may be a die for cutting threads on bolts or rods. Preferably these two parts are made separate, as shown the inner die which should be made of steel being secured in place by a screw K or other convenient means so that it can be removed and replaced by other dies of different sizes when desired.

A' is an arm extending from the rim A, and adapted to receive a handle G; on the opposite side of the rim is a projection $A^2$ which also may be used for a socket or handle G' as shown in Fig. 6, but which is shown in the other case as perforated to receive a pivot bolt F, on which is pivoted a lever E having a socket E' at its other end on which fits the handle G'. In these figures also the projection $A^2$ is provided with lateral lugs $A^3$ $A^3$ turned up at the ends as indicated at $A^4$, and in these turned up ends are secured stop-screws J, by adjusting which the movement of the lever E on its pivot pin can be regulated at will.

Referring now to Figs. 1 and 2 $E^2$ indicates an extension of the lever E which is adapted to received a cutting tool C; the tool being adjusted in the socket formed in the arm $E^2$ by means of a set-screw H, and held in place by a binding screw I. The position of the cutting tool C is such that when a threaded bolt or nut is screwed into the die B beyond its upper surface, the tool when forced inward will come against the thread and sufficient pressure being exercised will cut the thread away as the die is screwed off of it. The movement of the tool in against the bolt and away from it is regulated by the position of the stops J which limit the movement of the lever E by which the tool is actuated.

$A^3$ represents an extension of the lever E similar to the extension $E^2$, and adapted to receive a cutting tool to be used in cutting away the thread of a bolt having left hand threads; while the other is applicable to bolts having right hand threads.

In order to regulate the distance to which the thread should be cut away I provide an arm M secured to the rim A by a bolt N and provided with a screw O which is shown as in line with the center of the die.

The operation of the tool is simple and can be easily understood. When it is desired to apply it to any threaded rod the operator takes hold of the handles G G' turning them in the directions indicated by the arrows indicated in Fig. 1. This action, it will be noted, causes the lever E to turn in the direction which will draw the tool away from the center of the die, and therefore it does not come in contact with the screw on which the die is being secured. The tool is turned in this direction until the end of the screw projects beyond the die and comes in contact with the stop bolt O; the operator then unscrews the tool by turning the handles in the opposite direction to that shown by the arrows, and it will be seen that in thus reversing the tool by the handles G the lever C is caused to turn in the direction which presses the tool C inward against the projecting screw thread of the bolt. The cutting tool at once cuts down through the thread, and as the turning of the die continues cuts away all that portion of the thread which extends beyond the top of the die.

It will be noted that in this form of the tool the cutting tool proper is secured to the die only through the intervention of the lever E; this, however, is not an essential feature of construction, and in Figs. 3, 4 and 5 I have illustrated a modification in which the tool is secured directly to the face of the die by means of guide lugs L L, which as shown are formed with a rim A. As shown the cutting tool which is secured directly to a slide P having an adjusting screw H' which regulates its projection from this slide which is secured to the guides L and is provided with a recess P which is engaged by a rounded projection E⁴ from the lever E. In other respects the tool is identical with that shown in Figs. 1 and 2, and the operation of the tool is practically the same.

In Fig. 6 the cutting tool is secured in place in the same way as shown in Fig. 3, but in its construction the lever E is dispensed with, and in its place we have a lever e' pivoted to a bolt F' and having a cam shaped head e which as the lever e' is drawn in toward the handle G it will force the cutting tool in toward the die, and when thrust out away from the handle G it will prevent the cutting tool sliding away from the die. This modification differs from the others shown, in that while the others necessarily bring the cutting tool into operation as soon as the die is reversed; in the present construction the position of the cutting tool is independently regulated.

Having now described my invention, what I claim as new, and desire to secure by Letters Patent, is—

1. As a device for cutting down screw threads, a die A B having a threaded center B adapted to screw on to the screw to be treated, in combination with a longitudinal movable cutting tool C adjustably secured to said die so that its edge can be forced against the thread of the screw or withdrawn from its path at will, and means for moving said cutting tool longitudinally and so that its edge will be forced within or retracted from the threaded die center.

2. As a device for cutting down screw threads a die A, B having a threaded center B adapted to screw on the screw to be treated, in combination with a fixed handle G, a pivoted lever E having a handle G' secured to the die opposite handle G, an arm as E² secured to lever E, a cutting tool arranged to be thrust into operation by arm E and stops J arranged to regulate the movement of the pivoted lever E and its arm E².

3. As a device for cutting down screw threads a die A, B having a threaded center B' adapted to screw on the screw to be treated, in combination with a fixed handle G, a pivoted lever E having a handle G' secured to the die opposite handle G, an arm as E² secured to lever E, a cutting tool arranged to be thrust into operation by arm E, stops J arranged to regulate the movement of the pivoted lever E and its arm E², and a stop O arranged to regulate the point on the screw thread where the cut shall begin.

C. A. HIGBEE.

Witnesses:
LEWIS R. DICK,
J. H. RUSSELL.